Feb. 3, 1959 H. T. KRAFT 2,871,912
METHOD AND APPARATUS FOR APPLYING PREFORMED
BANDS TO A TIRE BUILDING MACHINE
Filed March 26, 1956 4 Sheets-Sheet 1
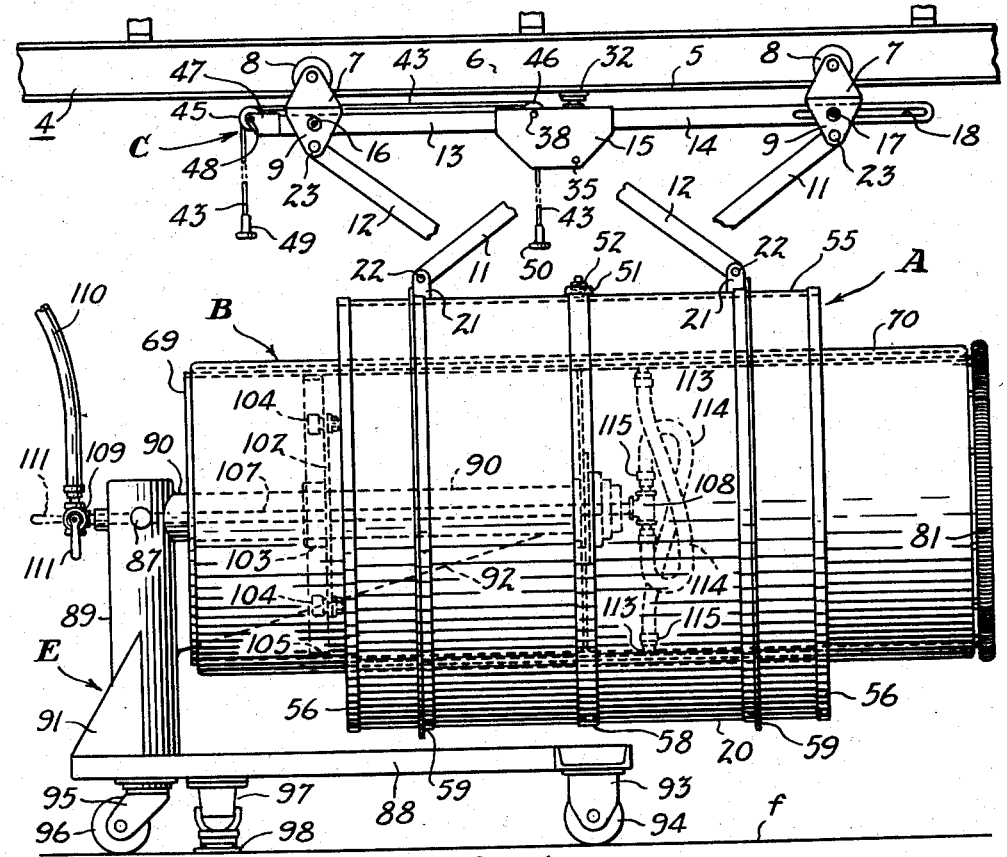
Fig. 1
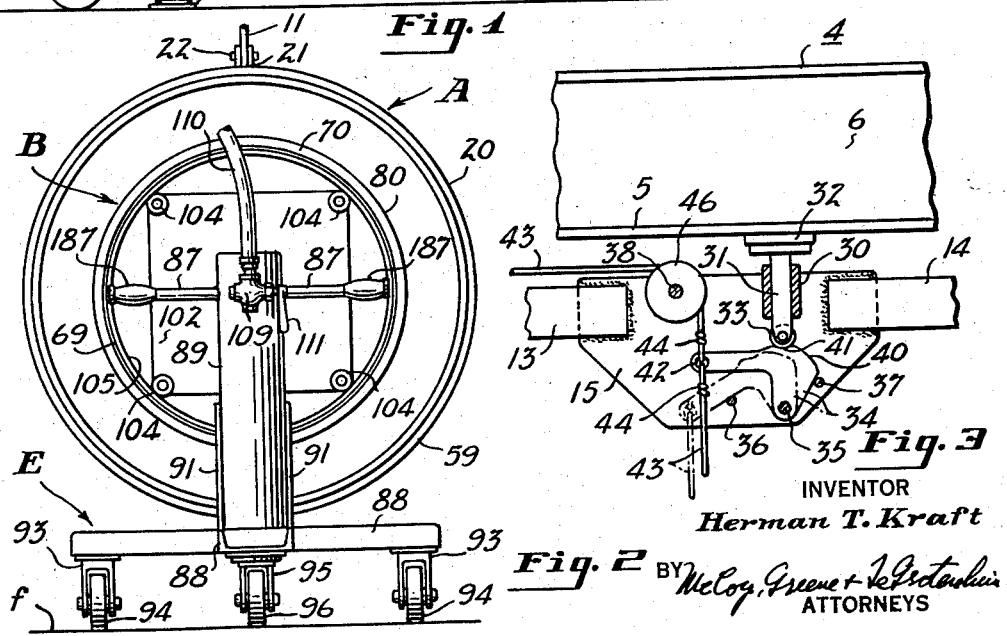
Fig. 2
Fig. 3
INVENTOR
Herman T. Kraft
BY
ATTORNEYS INVENTOR
Herman T. Kraft
ATTORNEYS Feb. 3, 1959 H. T. KRAFT 2,871,912
METHOD AND APPARATUS FOR APPLYING PREFORMED
BANDS TO A TIRE BUILDING MACHINE
Filed March 26, 1956 4 Sheets-Sheet 3

INVENTOR
Herman T. Kraft
BY McCoy, Greene + TeGrtenhuis
ATTORNEYS

Feb. 3, 1959    H. T. KRAFT    2,871,912
METHOD AND APPARATUS FOR APPLYING PREFORMED
BANDS TO A TIRE BUILDING MACHINE
Filed March 26, 1956    4 Sheets-Sheet 4
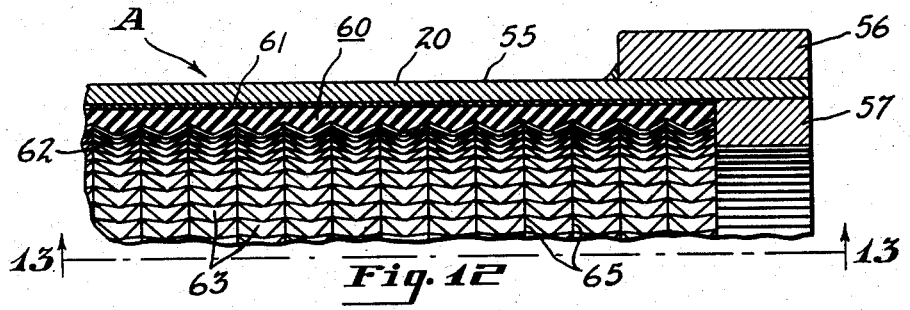
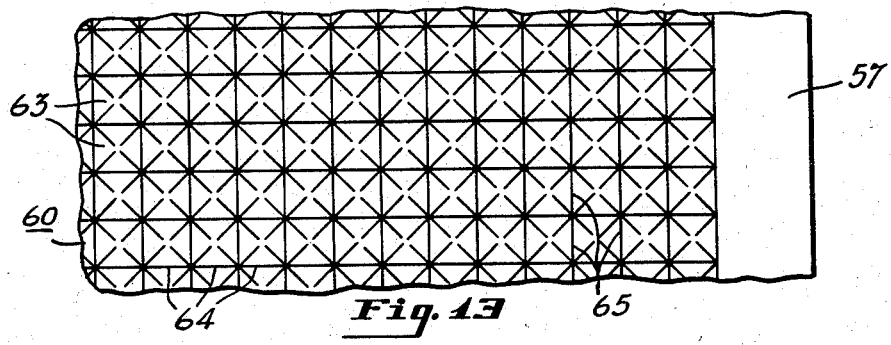
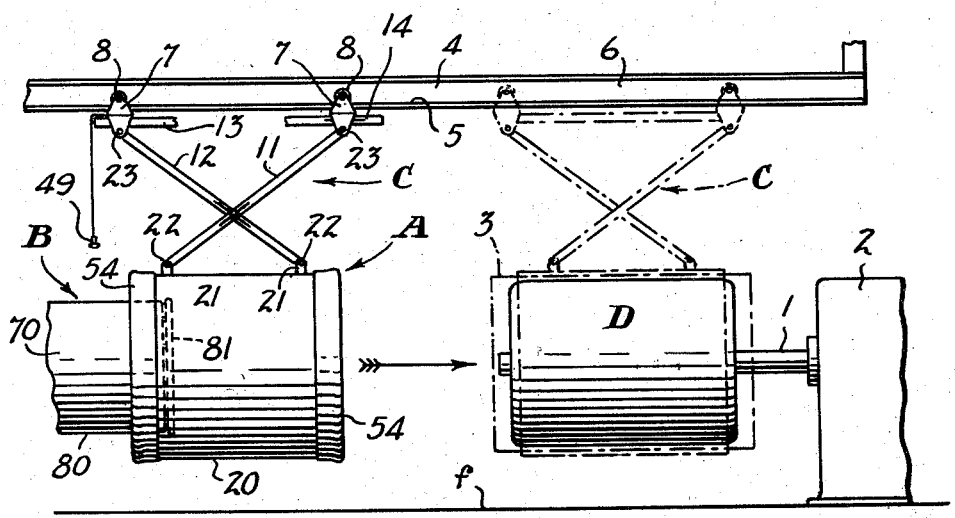
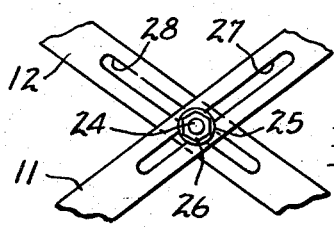
INVENTOR
*Herman T. Kraft*
BY *McCoy, Greene & te Grotenhuis*
ATTORNEYS United States Patent Office 2,871,912
Patented Feb. 3, 1959

2,871,912

METHOD AND APPARATUS FOR APPLYING PRE-FORMED BANDS TO A TIRE BUILDING MACHINE

Herman T. Kraft, Akron, Ohio, assignor to The General Tire and Rubber Company, Akron, Ohio, a corporation of Ohio Application March 26, 1956, Serial No. 573,850

11 Claims. (Cl. 154—9)

The present invention relates to the building of pneumatic tire casings, and more particularly to a method of and apparatus for applying preformed bands of elastic tire material to a tire-building drum.

Heretofore, machines have been provided for applying endless fabric bands to tire-building forms. However, just prior to the present invention, such machines were not used extensively, probably due to their high cost and inefficiency with tire-building drums used in most tire factories. The present invention provides an extremely simple way to apply the bands without the need for expensive or cumbersome apparatus and without any modifications in the tire-building drum. The invention represents a substantial advance in the art since it involves simple inexpensive apparatus which may be installed in existing tire factories easily without substantial alterations of existing facilities.

According to the invention, the application of fabric bands or tread stock bands to the tire-building machine is facilitated by the use of a transfer cylinder having an internal diameter greater than that of the tire-building drum. In transferring a preformed band of tire material to the tire-building drum by the method of the present invention, the band is placed within the transfer cylinder and fluid pressure is applied uniformly to the interior of the band to press the band radially outwardly against the interior of the transfer cylinder and to exclude air from between the band and the cylinder. The cylinder is then moved relative to the tire-building drum to position the band over the drum, the band being held by air pressure in its expanded position against the interior of the transfer cylinder during such movement. The band may then be released from the cylinder and mounted on the drum.

The elastic band is preferably expanded against the interior of the transfer cylinder by means of an expansible drum or band holder having a generally cylindrical outer surface with a circumference when contracted less than that of the band. Such a drum may be provided with one or more inflatable tubes so that the band is expanded radially by fluid pressure. The expansible drum preferably comprises an axially elongated inflatable tube of rubber-like material having a generally cylindrical shape in its expanded and contracted positions and an axial length not substantially less than that of the transfer cylinder or the elastic band which is to be expanded against said cylinder.

The elastic band may be held in its expanded position against the interior of the transfer cylinder by maintaining an air pressure on the interior of the band. An air-pressure differential between the interior and exterior surfaces of the band sufficient to hold the band radially outwardly against the cylinder may be maintained by excluding air from between the band and the cylinder. A suction pump may be connected by suitable conduits and passages to the transfer cylinder to maintain the necessary pressure differential. However, the provision of suction means is unnecessary where means is provided to prevent the entry of air between the band and the cylinder so that the band is held like a suction cup against the cylinder.

The tendency for air to enter between the band and the cylinder may be reduced by providing a roughened surface on the interior of the cylinder, by increasing the surface area of the interior surface per unit of axial length, by providing a knurled surface or the like having a multipliicty of protuberances, and in other ways.

It is preferable to provide a transfer cylinder having an axial length less than that of the elastic band so that the opposite ends of the band may be turned or "cuffed" over the ends of the cylinder. When the band is mounted on the cylinder in this way, it is relatively easy to exclude air from between the band and the cylinder during axial movement of the cylinder without employing a suction pump. It is relatively easy to release the band from the cylinder by pulling the cuffed end portions of the band beyond the ends of the cylinder so that air may enter between the band and the cylinder.

An object of the invention is to provide a method by which a band of tacky uncured stock may be quickly applied to a tire-building drum or to tire carcass bands previously applied to the drum.

A further object of the invention is to provide a method of and apparatus for applying fabric-reinforced bands of elastic tire stock in a stretched condition to the tire-building drum so that the reinforcing cords are spaced substantially uniformly throughout the tire casing.

A still further object of the invention is to provide apparatus for quickly and easily transferring fabric bands or tread stock bands to a tire-building drum.

With the above and other objects in view, the invention may be said to comprise the method and apparatus illustrated in the accompanying drawings, hereinafter described and particularly set forth in the appended claims, together with such variations and modifications thereof as will be apparent to one skilled in the art to which the invention appertains.

Reference should be had to the accompanying drawings forming a part of this specification in which like parts are identified by the same numerals throughout the several views and in which:

Figure 1 is a side elevational view of the apparatus of the present invention on a reduced scale with parts omitted and parts broken away;

Figure 2 is an end view of the apparatus of Fig. 1 on the same scale with parts omitted and parts broken away;

Figure 3 is a fragmentary side elevational view of the apparatus of Fig. 1 on a larger scale with parts omitted showing the brake for the transfer cylinder and a portion of the brake-operating mechanism, the control cam being shown in solid lines in its position when the brake is applied and in dot-dash lines in its position when the brake is released;

Figure 12 is a fragmentary longitudinal sectional view of the transfer cylinder with parts omitted showing the knurled construction of the interior surface;

Figure 13 is a fragmentary view taken on the lines 13—13 of Fig. 12;

Figure 4:
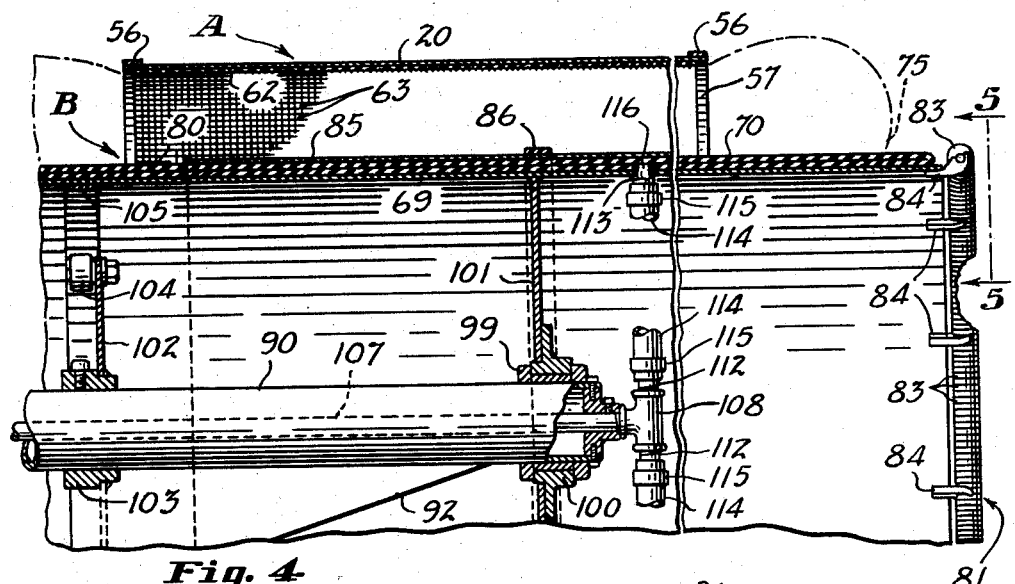
Figure 4 is a fragmentary longitudinal vertical sectional view through the axis of the rotatable band-holding drum with parts broken away, the inflation tube being shown in solid lines in its deflated position and in dot-dash lines in an inflated position.

Figure 14 is a fragmentary side elevational view on a reduced scale with parts broken away and parts omitted showing how the band is carried by the transfer cylinder to the tire-building drum, the drum being shown in solid lines with the band mounted thereon and in dot-dash lines in a discharge position concentric to the tire-building drum, the band being shown in dot-dash lines in a position after its end portions have been pulled off of the transfer cylinder and before it contracts on the drum; and Figure 15 is a fragmentary side elevational view showing a portion of the adjustable supporting frame for the transfer cylinder which was not shown in Fig. 1.

A preferred form of apparatus for performing the method of the present invention is shown in Figs. 1 to 15 and includes a transfer cylinder A, an expansible band-holding drum B for expanding the preformed elastic band against the transfer cylinder, and carriage means C for supporting and guiding the transfer cylinder as it is moved toward and away from the tire-building drum D.

The tire-building drum D may be of a conventional collapsible type used for making truck tires and is mounted in cantilever fashion above the floor on a horizontal shaft 1 driven by a suitable electric driving motor within the housing 2. The transfer cylinder A is of an internal diameter somewhat greater than that of the tire-building drum and greater than that of the preformed elastic band 3 that is to be transferred to the drum so that the band may be readily positioned within the cylinder and expanded against the cylinder and so that the cylinder may readily be moved axially to a position wherein the drum D is within the cylinder A and the band 3 carried thereby. The elasticity of the expanded uncured band causes it to snap inwardly out of engagement with the cylinder and into tight engagement with the drum or the material on the drum so that the transfer cylinder may be retracted from the drum. The cylinder A has an open end to receive the tire-building drum D and an open end to receive the expansible band-holding drum B, both ends preferably being open so that the cylinder may be moved axially from the band-holding drum to the tire-building drum without swinging the cylinder axis or moving it laterally.

The transfer cylinder A is preferably mounted on a suitable carriage or support for movement between a receiving position surrounding the band-holding drum B and a discharge position surrounding the tire-building drum D. Any suitable means may be provided for guiding the transfer cylinder in its movements between these positions. Such means preferably includes a runway leading from the drum B to the drum D. Such a runway may have one or more bands or curves therein depending on the location of the drums B and D and may be relatively long, but it is usually preferable to place the drums relatively close together so that the runway may be short and to place the drums in substantially coaxial relation so that the runway may be straight. The preferred construction comprises a track runway and trolley means or the like having suitable rollers or wheels guided by the track runway as in conventional trolley conveyors.

As herein shown, a carriage means C is provided for mounting the transfer cylinder including a straight I-beam 4 of conventional cross-sectional form having a pair of straight horizontal bottom flanges 5 of the same size and shape and a central vertical web 6 located substantially in a vertical plane containing the axis of the tire-building drum D and the axis of the expansible band-holding drum B. The I-beam track is mounted in a fixed horizontal position and extends the full length of both drums and beyond the supported ends of the drums so that the transfer cylinder A may be moved axially to any desired position relaitve to either drum.

As with conventional trolley conveyors, trolleys are provided to ride on the I-beam track and to support the load. Each trolley is of the conventional 2-wheel type and comprises a trolley hanger 7 having a pair of coaxial trolley wheels 8 rotatably mounted on the hanger and engaging the horizontal track flanges 5 on opposite sides of the web 6. Each trolley hanger is bifurcated and has two spaced vertical flanges 9 of generally triangular form to permit attachment of the trolley to the supporting frame of the transfer cylinder A.

It is preferable to provide a supporting frame for the transfer cylinder which may be adjusted as to vertical height and inclination to fit properly over the tire-building drum. As herein shown, the lower portion of the supporting frame is formed by crossing bars 11 and 12 of the same legnth connected between the two trolley hangers and the transfer cylinder, and the upper portion of the supporting frame is formed by aligned horizontal bars 13 and 14 and a pair of parallel vertical plates 15 welded to the adjacent ends of said horizontal bars.

The bars 13 and 14 are parallel to the I-beam track 4 and are rigidly connected to the trolley hangers 7 so as to be supported in such a position when the trolley is moved along the track. As herein shown, the bars 13 and 14 extend between the flanges 9 of both hangers and are rigidly connected to said flanges by bolts 16 and 17 which extend through the bars and the flanges. The bar 14 has a horizontally elongated slot 18 with a width corresponding to the diameter of the bolt 17 to receive the bolt whereby the trolley hanger connected to the inclined bar 11 may be adjusted to any desired position along the length of the slot.

The rigid outer cylindrical metal shell 20 of the transfer cylinder A has a pair of aligned yokes or lugs 21 welded thereto at the top of the cylinder to permit attachment of the bars 11 and 12, each yoke being spaced several inches from an end of the transfer cylinder and having aligned circular openings therein for receiving a horizontal pivot pin or bolt 22. The lower portions of the flanges 9 of each trolley hanger are provided with similar aligned circular openings of a size to receive a horizontal pivot pin or bolt 23. The opposite end portions of both bars 11 and 12 are provided with similar openings of a size to receive the pins 22 and 23 and are pivotally connected to the trolley hangers 7 and the yokes 21 by means of said pins whereby the transfer cylinder A is supported and held against rotation.

The bars 11 and 12 are connected together where they cross by means of a threaded hex-head bolt 24 having a washer 25 and a hexagonal nut 26. Said bars are provided with elongated slots 27 and 28, each having a width corresponding to the diameter of the bolt 24, so as to permit adjustment of the distances from said bolt to the pins 22 and 23. These slots, together with the slot 18, permit the desired adjustment of the transfer cylinder relative to the track 4.

The track and trolley facilitate manual movement of the transfer cylinder A axially from a band-receiving position surrounding the expansible drum B to a discharge position surrounding the tire-building drum D. Due to the low friction between the trolley wheels 8 and the track flanges 5, very little force is required to move the transfer cylinder. It is, therefore, preferable to provide a brake or other means to increase the friction so that the cylinder will not move while a preformed elastic band is applied to or removed from the cylinder.

Figure 3 shows schematically one type of releasable brake which could be used. As shown, the plate 15 of the frame has a boss 30 rigidly mounted thereon with a vertical cylindrical bore of a size to receive a cylindrical brake rod 31. The upper end of the vertically movable rod has a head thereon which provides a pressure pad or shoe 32 for frictionally engaging the bottom of the I-beam 4. The lower end of the rod 31 has a circular cam roller 33 rotatably mounted thereon for engaging the cam surface of an L-shaped lever 34. A horizontal cylindrical pivot pin or shaft 35 extends between the plates 15 and through a circular opening in the lower end portion of the lever 34 to provide a pivotal connection between the lever and the plates 15. A pair of stop pins 36 and 37 and a pulley shaft 38 extend between the plates 15 parallel to the shaft 35 and are rigidly connected to said plates, the stop pins limiting movement of the lever 34. The cam surface 40 of the lever is designed to move the brake shoe 32 to a locking position against the I-beam 4 when the lever is moved against the stop pin 37, as shown in solid lines in Fig. 3, and is designed to permit movement of the shoe away from the I-beam when the lever is moved against the stop pin 36 as shown in dot-dash lines in Fig. 3. As herein shown, the cam surface has a depression at 41 into which the roller 33 drops to hold the lever in its locking position.

The lever 34 may be moved manually in any desired manner from the locked to the released position. As herein shown a hole 42 is provided at the end of the lever to receive a control cord 43 which is tied with a knot larger than said hole whereby the lever may be moved to its desired position by pulling on the cord. A pair of pulleys 45 and 46 are provided for supporting a portion of the string parallel to the bar 13 so that the ends of the string may easily be reached by an operator. A pair of vertical metal plates 47 are welded to the end of the bar 13 to provide a support for a horizontal shaft 48 parallel to the shaft 38, the pulleys 45 and 46 being rotatably mounted on these shafts as best shown in Fig. 1. If desired, suitable handles 49 and 50 may be connected to the opposite ends of the string 43 to weight down said ends. As herein shown, the brake is applied by pulling the handle 49 and is released by pulling the handle 50.

The transfer cylinder A has an internal circumference greater than the normal circumference of the preformed elastic band to be applied to the tire-building drum D so that the band must be stretched and expanded against the interior surface of the transfer cylinder. Where the band is a relatively thick tread stock, the interior of the cylinder may be shaped accordingly, for example, generally as disclosed in United States Letters Patent No. 2,517,889. Where two-ply and four-ply fabric bands are being applied, the interior surface may be cylindrical substantially throughout the length of the cylinder.

A preformed elastic band may be held by means of air pressure in its expanded position against the interior of the transfer cylinder while it is being positioned around the tire-building drum without rotating the cylinder. An air pressure differential between the radially inner and outer surfaces of the elastic band sufficient to hold the band in its expanded position against the interior of the transfer cylinder may be maintained during axial movement of the transfer cylinder relative to the tire-building drum by excluding air from between the band and the interior surface of the transfer cylinder.

Where the transfer cylinder has an axial length greater than that of the preformed elastic band (as in said Patent No. 2,517,889), the exclusion of air from between the band and the cylinder may be effected by the use of a vacuum pump or the like to maintain the needed vacuum. As herein shown, the outer cylindrical metal shell 20 of the transfer cylinder A has an annular boss 51 welded thereto which is internally threaded for connection to a suction conduit whereby a suction pump may be connected by a flexible hose or conduit to the transfer cylinder. A circular opening is provided in the transfer cylinder leading radially through the boss 51 to the interior of the cylinder so that air may flow from the interior of the cylinder through the boss 51 to the suction conduit. This opening is sealed by an externally threaded plug 52 which is screwed into the boss 51 when the suction pump is not being used.

The flexible hose leading from the suction pump to the air outlet at 51 may be arranged so that it does not interfere unduly with axial movement of the transfer cylinder, but it is preferable to design the transfer cylinder so that vacuum applying means and the accompanying vacuum hoses may be omitted. The partial vacuum necessary to hold the preformed elastic band against the transfer cylinder during the time the cylinder is moved axially over the tire-building drum may be maintained without the use of a vacuum pump by preventing the entry of air between the transfer cylinder and the band after the band is expanded against the cylinder. The interior surface of the transfer cylinder may be provided with suitable air passages to facilitate the removal of the air from between the band and the cylinder and may be provided with a series of knurls or protuberances of various types to increase its surface area per unit of length so that it is easier to maintain the needed partial vacuum. Excellent results are obtained where the cylinder A has a knurled internal surface with grooves therein providing passages for conducting air along the length of the cylinder. The term "knurled surface" is used herein in the broad sense to cover a surface having a multiplicity of protuberances (knurles) and is not intended to be limited to a metal surface deformed by a knurling tool, even though the term happens to be most commonly used to describe the latter type of surface.

The entry of air between the expanded band and the transfer cylinder is more easily prevented when the transfer cylinder has an axial length less than that of the band and is constructed to permit turning the end portions of the band over the ends of the cylinder to form cuffs. As herein shown, the transfer cylinder A is constructed so that the opposite end portions of the unvulcanized 2-ply elastic fabric band 3 may be turned radially outwardly and axially inwardly over the ends of the cylinder to form cuffs 54 having an axial width of several inches, the center of each lug 21 preferably being spaced more than six inches from the nearest end of the cylinder A to permit forming a cuff of substantial width at each end of the cylinder. As shown, the cylinder A has an axial length a few inches less than that of the tire-building drum D and is constructed so that the cuffs 54 may have a width up to around eight inches without touching the lugs 21. However, it will be understood that the size of the cylinder relative to the drum and the desired size of the cuffs will depend on the size of the tire being built and may vary considerably. Also, the cuffs may extend a short distance over the lugs 21 in some cases.

The thin metal shell 20 of the cylinder shown herein is in the form of a right circular cylinder and has a smooth cylindrical outer surface 55. The opposite ends of the shell are reinforced by annular outer metal rings 56 of uniform rectangular cross section and annular inner metal rings 57 of uniform rectangular cross section. As herein shown, each ring 56 has an axial length of about one inch and a radial thickness of about one-quarter inch and each ring 57 has an axial length of about one-half inch and a radial thickness of about one-quarter inch, but it will be understood that the sizes of these rings may vary considerably and that the rings may be omitted where the shell does not require reinforcement. Both ends of each ring 56 and 57 is rigidly connected to the shell 20 by suitable tack welds. A central ring 58 of the rectangular cross section and a pair of annular angles 59 of L-shaped cross section are also welded to the shell 20 to reinforce the same.

When the end portions of the unvulcanized band 3 are turned over the end portions of the transfer cylinder A, the entry of air between the band and the cylinder may be prevented and the necessary partial vacuum may be maintained, without employing garter springs or other means to press the cuffs 54 against the cylindrical surface 55 or against the rings 56, due to the fact that the uncured rubber-covered fabric band 3 has some elasticity. Since the surface 55 has a circumference greater than that of the band 3 in the normal unstretched condition, the cuffs 54 are in a stretched condition and grip the surface 55 and the rings 56 to resist the entry of air. The cuffs also serve to support the weight of the end portions of the band 3 and to reduce the tendency of these end portions to contract or to separate from the cylinder A.

As herein shown, the interior cylindrical surface of the metal shell 20 between the rings 57 is completely covered by a cylinder 60 which is bonded to the shell by a layer of cement 61. The cylinder may have a uniform cross section substantially as shown in Fig. 12 and a generally cylindrical knurled inner surface 62 formed by aligned rows of pyramids 63 of the same size and shape. The pyramids have square bases and are arranged to provide parallel equally spaced shallow axial grooves 64 and parallel equally spaced shallow circumferential grooves 65, perpendicular to the grooves 64. The grooves 64 and 65 extend throughout the length and circumference of the cylinder 60 so as to provide a multiplicity of passages for conducting air from between the band 3 and the knurled surface 62.

These passages lead to an opening in the cylinder 60 which registers with the openings in the shell 20 and the boss 51 so that the air may flow along the length of the cylinder through the outlet at 51 when a suction hose is connected to said outlet. When this outlet is closed by the plug 52, the air passages formed by the grooves 64 and 65 conduct the air along the length of the cylinder 60 to the rings 57 at the opposite ends of the cylinder so that the air can be forced out from between the transfer cylinder and the band. The grooves 64 and 65 prevent the forming of air pockets between the band and the cylinder which would make it difficult to provide the vacuum needed to hold the band expanded against the cylinder. The pyramids 63 can provide a knurled surface 62 having a surface area at least around ten percent greater than the area of a smooth cylinder of the same average diameter and length.

The cylinder 60 may be made of a metal, such as steel or other hard material, or of a softer plastic or a deformable elastic material. Excellent results are obtained where the cylinder 60 is molded as a sheet of soft elastic rubber-like material. In the apparatus shown herein, the cylinder 60 is formed of soft deformable elastic rubber which is vulcanized in a mold to provide the knurled surface 62. Any suitable rubber compound may be employed including gum stock and conventional tread rubber compounds.

The two-ply band 3 shown herein is formed from conventional bias-cut fabric comprising cords of nylon, rayon, or the like held in parallel relation and embedded in a layer of conventional unvulcanized elastic rubber carcass compound or the like. This band has a diameter suitable for application to the tire-building drum D and must be expanded several inches when it is mounted on the transfer cylinder A. It is important that the band be expanded without disturbing the even spacing of the cords of the band so that the cords will be evenly spaced when the band is applied to the tire-building drum.

A fairly even spacing of the cords may be obtained by expanding the band using a method similar to that employed in said United State Patent No. 2,517,889, but it is preferable to expand the band uniformly by applying fluid pressure throughout the circumference of the band. The pressure may be applied uniformly using an expandable drum of the general type disclosed in my United States Patent No. 2,614,952 having a plurality of annular inflatable tubes or bags covered with metal shell elements or may be applied using one or more inflatable bags or tubes of the type shown in Fig. 35 of my U. S. Patent No. 2,838,091. Such bags retain a generally cylindrical shape while they are expanded and contracted.

The most practical type of expansible band-holding drum employs only one tube or bag which has an axial length greater than that of the transfer cylinder. The expansible drum B shown herein is of this type. This drum comprises a rigid rotatable metal cylinder 69 of uniform radial thickness having an axial length more than five times its radius and an annular inflatable tube or bag 70 mounted on said cylinder and extending substantially the full length of the cylinder. The tube 70, in the normal unstressed deflated condition shown in Figs. 1, 4 and 6 comprises concentric cylindrical inner and outer parts integrally joined near the opposite ends of the cylinder 69 and spaced apart a distance not substantially greater than the radial thickness of the outer part. Said inner and outer parts are formed by inner and outer tubular elastic impervious vulcanized rubber layers 71 and 72 of substantially uniform thickness and a multiplicity of closely spaced reinforcing cords 73 sandwiched between and integrally joined to said layers.

The reinforcing cords may be held in parallel relation by weak weft threads which will break as soon as the tube is inflated or may be conventional weftless fabric. One or two plies of fabric reinforcement may be employed, but the cords are arranged generally parallel to the axis of the cylinder 69 so that they do not intefere with radial expansion of the tube.

Figure 7:
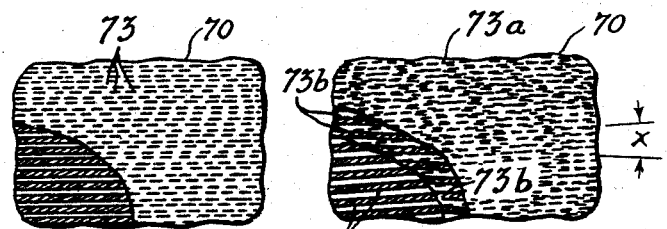
Figure 7 is a fragmentary view of the bag taken on the line 7—7 of Fig. 6 and on the same scale showing the arrangement of the longitudinal reinforcing cords.

Figure 7 shows the preferred construction wherein all the cords 73 are parallel to the axis of the cylinder 69. As will be apparent from the drawings, the cords 73 extend axially completely around the tube and are closely spaced around the circumference of the tube. As shown, there are in the neighborhood of thirty cords 73 per inch of circumference, but the spacing of the cords obviously may vary substantially.

Figure 8:
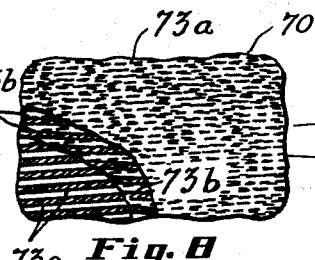
Figure 8 is a fragmentary view similar to Fig. 7 of a modified form of inflation bag wherein the reinforcing cords cross at a small angle indicated by the dot-dash lines, the inflation bag of Fig. 8 having the same cross section as shown in Fig. 6.

Figure 8 shows a modified form which could be employed wherein two plies of fabric are vulcanized between the tubular layers 71 and 72. The first ply is made up of parallel cords 73a and the second ply is made up of parallel cords 73b which cross the former cords at a small angle $x$ as indicated in Fig. 8. This angle may be five degrees or so without there being any undue resistance to radial expansion. Where the fabric is cut at an angle of 88°, the cords 73a and 73b can be substantially parallel to the cylinder axis since the angle between the cords and said axis is only two degrees or so.

The inner part of the annular tube 70 is held against the cylinder 69 by a pair of inextensible metal bead rings 74 which are spaced from the ends of the deflated tube a distance substantially less than one-sixth the axial length of the tube. The end portions 75 of said inner part are disconnected from the cylinder 69 axially outwardly of said bead rings so that they are free to move away from said cylinder when the tube is inflated to permit the radial expansion necessary to press the band 3 against the transfer cylinder. As herein shown, the center of each bead ring 74 is about four inches from the end of the cylinder 69 and about three and one-half inches from the end of the deflated tube 70, but it will be obvious that this distance will vary depending on the amount of radial expansion desired.

Figure 6:
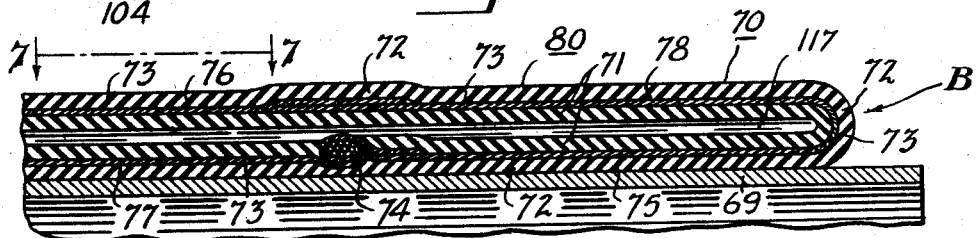
Figure 6 is a fragmentary longitudinal vertical sectional view with parts omitted similar to Fig. 4 and on a larger scale showing the construction of the inflation tube or bag.

The reinforcing cords 73 may be mounted in the tube 70 in various ways, the following description being by way of illustration rather than limitation. The tube shown herein is made from long single-ply fabric strips 76 and 77 and short single-ply end strips 78 which overlap the longer strips near the vertical planes containing the bead rings 74, said strips having about 32 cord ends per inch of width. The long strips and the cords 73 thereof have a length of more than six feet and extend most of the length of the cylinder 69, the end strips 78 being wrapped around the bead rings as shown in Fig. 6 and extending around the ends of the tube to the outer strips 76 so that the tube is reinforced throughout its length and circumference by the longitudinal cords 73.

Figure 9:
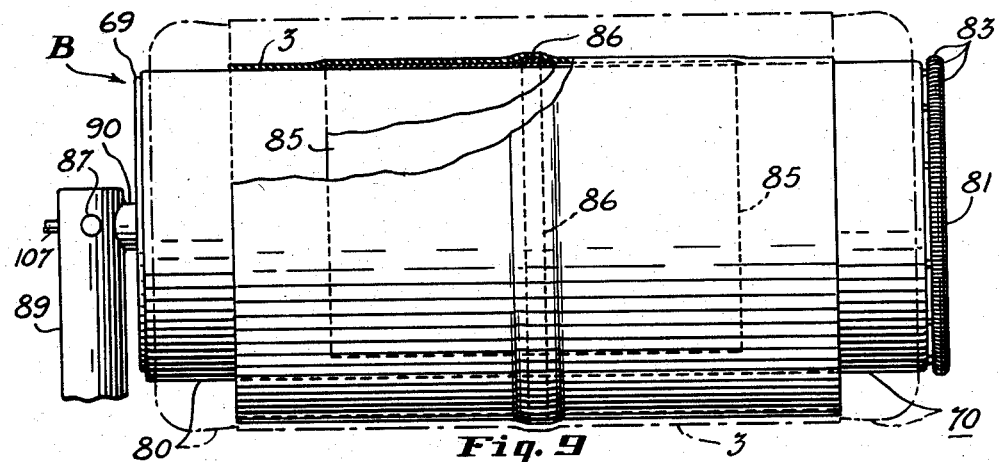
Figure 9 is a side elevational view on a reduced scale with parts broken away and shown in section showing an elastic fabric band in place on the expansible band-holding drum.

The outer surface 80 of the tube 70 is cylindrical when the tube is deflated as shown in Figs. 4 and 9 and has a diameter several inches less than that of the band 3 so that the band may readily be slipped over said surface to the position shown in Fig. 9. Said outer surface 80 remains generally cylindrical as the tube is inflated to a diameter corresponding to that of the transfer cylinder due to the construction of the tube even if said surface is not subjected to external forces from a metal shell. This is quite different from ordinary vehicle tires which become toroidal when they are inflated. The ability of the tube 70 to retain a generally cylindrical shape when inflated appears to some extent to be due to the length of the tube. It will be noted that the tube has an axial length many times its radial height even when the tube is inflated. As herein shown, the tube 70 when deflated has a radial height less than one-tenth its axial length and when inflated against the transfer cylinder A has a radial height less than one-sixth its axial length.

Figure 5:
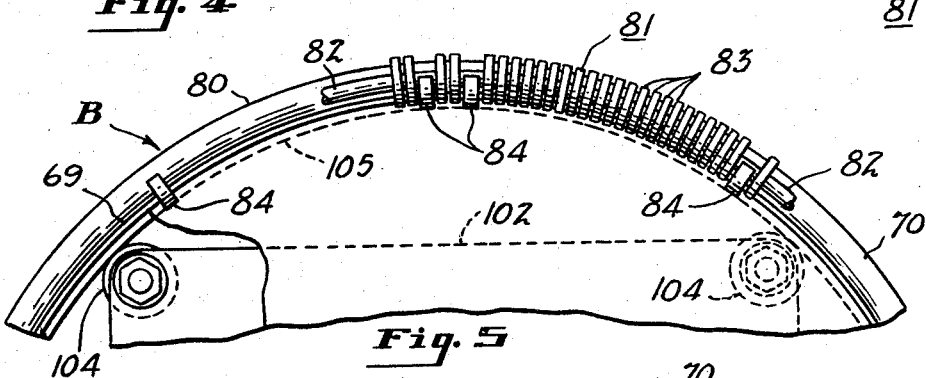
Figure 5 is a fragmentary end view of the band-holding drum taken substantialy on the line 5—5 of Fig. 4 and on a larger scale with parts omitted and parts broken away.

If desired, means may be provided to facilitate mounting of the band 3 on the band-holding drum B. Such means may take the form of a metal garter spring or other toroidal ring mounted on the end of the cylinder 69 to reduce the friction between the drum and the band when the weight of the band is supported by the drum. However, better results are obtained by mounting rollers on the projecting end of the cyinder 69. As herein shown, a toroidal ring 81 is mounted on the cylinder which comprises a metal rod 82 of circular cross section which is bent to a circular shape and a multiplicity of flat wooden rollers 83 of uniform thickness closely spaced throughout the circumference of the rod and mounted for rotation on said rod. A series of circumferentially spaced holders 84 are welded to the inner surface of the cylinder 69 to support the rod, said holders having holes therein of a size to receive the rod so that the rod is held concentric to the cylinder as best shown in Fig. 5. The rollers 83 extend radially outwardly a short distance beyond the surface 80 of the deflated tube 70 and provide a generally toroidal supporting surface having an external diameter greater than that of the deflated tube. These rollers do not provide any substantial frictional resistance and greatly facilitate mounting of the band 3 on the tube.

The friction involved during mounting of the band may be further reduced by providing a smooth hard surface on the outside of the tube 70, but this is not essential. The tube may be covered within a thin expansible metal shell or the like to reduce the friction. As herein shown, the upper central portion of the tube is covered with a thin smooth imperforate metal sheet 85 of rectangular shape which is bent to a cylindrical shape to fit on the outer surface 80 of the tube. This sheet extends about three-fourths of the way around the tube and has an axial length about half that of the cylinder 69. An endless elastic rubber band 86 having a normal circumference less than that of the deflated tube 70 is mounted on the sheet 85 to hold the sheet in its desired position against the tube as shown in Fig. 9. This band permits expansion and contraction of the sheet 85 with the tube 70 and does not interfere with movement of the band 3 over the tube. It will be understood that the apparatus will function effectively without the sheet 85 and the band 86 and that these parts may be removed. The tube 70 will retain a generally cylindrical shape during expansion where the sheet 85 is removed.

It will be noted that the weight of the fabric band 3 tends to separate the cords of the band by applying a substantial tension to portions of the band when the band is mounted on the drum B as shown in Fig. 9. If the drum B is held stationary, this tension causes the cords at the top of the drum to be spaced apart more than the cords at the bottom of the drum, a very undesirable result in the manufacture of pneumatic tires. According to the method of the present invention, the drum B is rotated 180° with the band 3 mounted loosely thereon before the band is mounted on the transfer cylinder so as to reduce the unevenness in the spacing of the cords and to improve the quality of the tire made on the drum D.

The drum B is rotatably mounted in cantilever fashion so that it can be turned manually to perform this method. The cantilever support may be a permanent stationary support bolted to the floor or may be portable so that the drum B may be moved to another tire-building drum whenever it is desirable to rearrange equipment.

As herein shown, a hand truck E is provided for supporting the drum B. The truck has a welded metal frame including a plurality of horizontal steel channels below the drum and less than one foot above the floor providing a lower frame portion 88 extending the full length and width of the truck, a vertical tubular steel standard 89 at one end of the frame portion 88, and a horizontal tubular steel cantilever arm 90 welded to the standard. A pair of vertical gusset plates 91 are welded to the frame portion 88 and the standard 89 and a larger vertical gusset plate 92 is welded to the standard and to the arm 90 to support the arm.

A pair of fixed metal casters 93 having wheels 94 are mounted on the laterally extending channels of the frame portion 88 at opposite sides of the truck below the drum B, and a "swivel" caster 95 having a wheel 96 is mounted on the longitudinally extending channel of the frame portion 88 for turning movements about a vertical axis. The swivel caster permits moving the 3-wheel truck E in any direction, a pair of horizontal bars 87 being welded to the standard 89 for this purpose and having rubber handle grips 187.

A conventional "Bassick" truck lock 97 is rigidly mounted on the longitudinal channel of the frame portion 88 and extends downwardly therefrom for engaging the floor surface $f$ to provide a brake. The truck lock has a vertically movable shoe 98 which may be locked in a braking position against the surface $f$ to prevent movement of the truck and which may be moved upwardly to a released position to permit the wheels 9 to roll on the surface $f$. When the brake is released, the truck may be pushed in the desired direction.

Bearing means are provided for supporting the metal cylinder 69 so that it may rotate through an angle of at least 180°. As herein shown, an annular bearing 99 is mounted at the end of the tube 90 concentric to the tube and has an annular hub 100 mounted for rotation thereon. A flat circular plate 101 having an external diameter corresponding to the internal diameter of the cylinder 69 is welded to said cylinder and to the hub 100 in a vertical position perpendicular to the cylinder axis so that the hub and the cylinder remain coaxial with the tube 90 during rotary movements of the drum B.

The other end of the drum B must be supported in a different manner because of the gusset plate 92. A flat substantially square plate 102 is welded to an annular hub member 103 having an internal diameter corresponding to the external diameter of the tube 90, and said plate and said tube are slotted to fit over the gusset plate 92. The hub 103 is then rigidly mounted on the tube 90 to hold the plate perpendicular to the axis of the tube as shown in Fig. 4. A series of externally cylindrical anti-friction rollers 104 are mounted on the corner portions of the plate 102 for rotation about horizontal axes parallel to and spaced equal distances from the axis of the tube 90. These rollers engage the smooth interior cylindrical surface of a metal bearing ring 105 having an external diameter corresponding to the internal diameter of the cylinder 69 so as to hold the cylinder concentric to the tube 90, said bearing ring being welded to the cylinder for rotation therewith. The bearing means at 99 and 104 support the band-holding drum B so that it may readily be rotated by hand through an angle of 180° or more in either direction to perform the method of the present invention.

Any suitable means may be provided for supplying fluid to and for exhausting fluid from the tube 70. As herein shown, a horizontal metal pipe 107 extends through the tube 90 and is held concentric to the tube. One end of the pipe is connected to a conventional T-fitting 108 at one end of the tube 90 and the other end is connected to the metal body of a three-way valve 109 having an air inlet and an air outlet. The inlet is connected to a flexible hose or supply conduit 110 of substantial length which leads to an air pump or other source of air under pressure.

When the valve handle 111 is in the vertical position shown in solid lines in Fig. 1, the valve 109 permits the flow of air from the supply conduit 110 through the pipe 107 to inflate the tube 70 and shuts off the exhaust. When the handle is moved to the horizontal position shown in dot-dash lines in Fig. 1, the supply of air through the valve inlet is cut off and the valve establishes communication between the valve outlet and the pipe 107 to permit exhausting of the air from the tube 70.

A pair of short pipes 112 are screwed into the T-fitting 108, and a pair of pipes 113 are welded to the cylinder 69 for receiving a pair of long flexible rubber hoses 114. The hoses are mounted on the ends of said pipes and are held thereon in a leak-proof manner by clamps 115. The pipes 113 are located at diametrically opposed locations on the cylinder 69 and supply air from the hoses 114 to the inlet openings 116 which communicate with the interior chamber 117 of the inflatable tube 70. The air is supplied to and exhausted from the chamber 116 through the opening 117, the hoses 114, the pipe 107, and the valve 109 as is apparent from the drawings. Suitable relief valves or the like may also be provided if desired to prevent the supplying of excessive air pressure. The air pressure should never exceed ten pounds per square inch gage, but the tube 70 may be reinforced by the cords 73 so as to withstand higher pressures without blowouts.

The apparatus of the present invention should be constructed so that there is at least one or two inches radial clearance between the transfer cylinder and the tire-building drum and so that there is several inches of radial clearance between the transfer cylinder and the band-holding drum when the inflatable tube of said drum is deflated. The internal diameter of the transfer cylinder A is preferably about 2 to 6 inches greater than that of the tire-building drum D, and the external diameter of the inflatable tube 70 in the deflated condition shown in Fig. 1 is preferably at least about 8 to 20 inches less than the internal diameter of the transfer cylinder and several inches less than the external diameter of the drum D. As shown in Fig. 14, which is drawn substantially to scale, the surface 80 has a diameter of around 33 inches when the tube 70 is deflated, the metal end rings 57 of the transfer cylinder have an internal diameter of around 45 inches, and the tire-building drum D has an external diameter of around 40 inches, but it will be apparent that these dimensions will vary depending on the size and type of tire being built. The deflated tube 70, for example, may have a length anywhere from five to ten feet or more depending on the size of the tire, and the transfer cylinder may have a length anywhere from three to seven feet or more. It will be noted that the length of the transfer cylinder is usually not substantially different from the length of the tire-building drum.

When the apparatus shown herein is operated according to the method of the present invention, the preformed endless 2-ply bias-cut fabric band 3 is pulled over the rollers 83 of the toroidal ring to a central position on the band-holding drum B as shown in solid lines in Fig. 9. The valve 109 is then controlled to admit air to the tube 70 without rotating the tube until the tube is expanded to the position shown in dot-dash lines in Fig. 9. A fluid pressure in the neighborhood of about one pound per square inch gage may be sufficient for this initial expansion. This expansion may be to within an inch or less of the transfer cylinder, where the transfer cylinder is placed around the tube, but is preferably insufficient to press the band against the interior of the cylinder.

The initial expansion tends to expand the upper part of the band 3 more than the lower part below the tube due to the action of gravity. In order to equalize the spacing of the cords of the fabric, the tube 70 is deflated to reduce its diameter at least several inches so that the brand 3 hangs like a loose belt, the drum B is rotated manually through an angle of 180° from its position during the initial inflation, and the tube is again inflated without rotating the tube (all of which operations can be performed in a few seconds). During the latter inflation, the band 3 and the transfer cylinder are located centrally of the tube 70 so that the band may be expanded into engagement with the cylinder.

Figure 10:
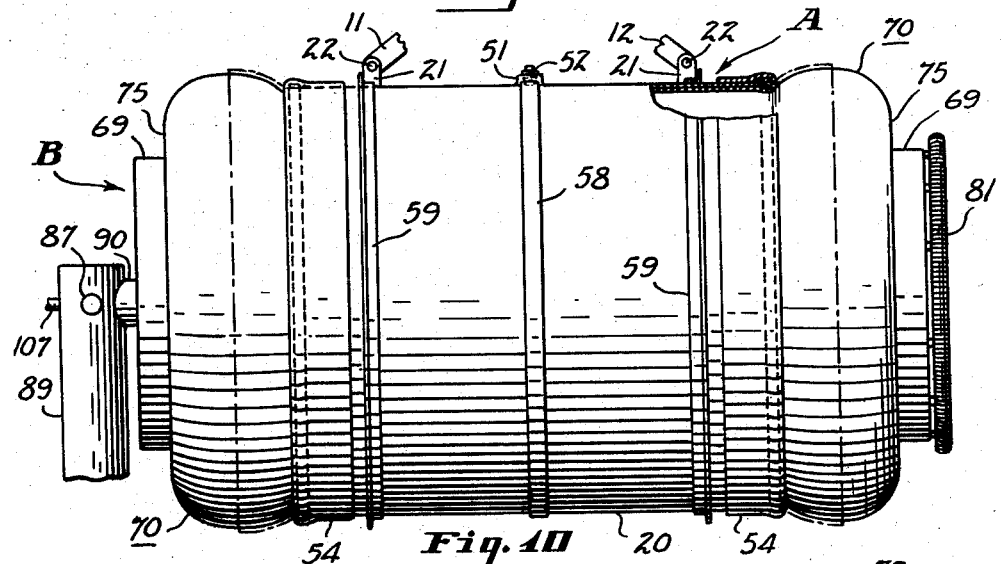
Figure 10 is a fragmentary side elevational view similar to Fig. 9 and on the same scale with parts broken away and shown in section showing the band-holding drum within the transfer cylinder with its inflation tube expanded and the end portions of the band cuffed over the ends of the transfer cylinder.
Figure 11:
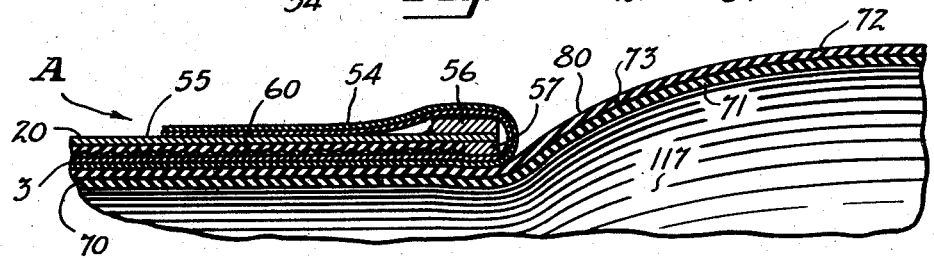
Figure 11 is a fragmentary longitiudinal vertical sectional view showing portions of the band-holding drum and transfer cylinder on a larger scale.

The pressure applied during the latter expansion, which may be on the order of two or three pounds per square inch gage, is sufficient to press the band 3 tightly against the knurled surface 62 so as to remove the air from between said surface and said band and preferably is sufficient to bulge the end portions of the tube 70 to some extent as shown in Figs. 10 and 11. The bulging of the tube insures that the band 3 is pressed tightly against the interior of the transfer cylinder at the ends of the cylinder and expands the end portions of the band 3 so that it is relatively easy to turn these end portions over the cylinder to form the cuffs 54. Pressures of four or five p. s. i. gage or even higher may be employed where the tube is reinforced so that it will not be damaged by these pressures, but lower pressures are usually satisfactory.

As soon as both cuffs 54 are formed, the tube 70 is deflated, the handle 50 is pulled to release the trolley brake, and the transfer cylinder A is moved axially to a position surrounding the tire-building drum D as shown in dot-dash lines in Fig. 14. The handle 49 is then pulled to apply the trolley brake so that the transfer cylinder is held centrally of the tire-building drum, and the cuffed end portions of the band at 54 are manually pulled off of the transfer cylinder. Air is then allowed to enter between the expanded band 3 and the transfer cylinder. The expanded band has some elasticity and readily contracts out of engagement with the knurled surface 62 and into engagement with the drum D or the carcass material on said drum as soon as the air is allowed to enter at the ends of the transfer cylinder. This frees the transfer cylinder from the band so that the cylinder may be moved away from the tire-building drum.

If another elastic fabric band 3 is to be applied to the tire-building drum, this band is mounted on the band-holding cylinder B while the transfer cylinder A is positioned around the tire-building drum where the cylinder will not interfere with the mounting of said band. The distance between the end of the tire-building drum D and the end of the band-holding drum B is preferably greater than the length of the preformed band 3 so that there is ample space for mounting this band. After the band is mounted on the drum B, the transfer cylinder may be again moved over the band as described above and the operation repeated. In this way several bands may be mounted on the tire-building drum in a minimum period of time even where the bands are of a relatively large size as is required for many truck tires.

It will be understood that the above description is by way of illustration rather than limitation and that, in accordance with the provisions of the patent statutes, variations and modifications of the specific methods and apparatuses disclosed herein may be made without departing from the spirit of the invention.

Having described my invention, I claim:

1. A method of applying bands of elastic material to a tire-building drum which comprises forming an endless band of said material, expanding said band against the interior of a hollow cylinder of a circumference greater than that of the band and greater than that of said drum and causing said band to press radially outwardly against the interior of said cylinder throughout its length and circumference to exclude air from between said band and said cylinder, holding said cylinder against rotation and excluding air from between said band and said cylinder to maintain an air pressure differential between the radially inner and outer surfaces of said band sufficient to hold the band in an expanded position against the interior surface of said cylinder while positioning the cylinder and the expanded band in a stationary position over said tire-building drum, and thereafter admitting air between the band and the cylinder to cause the band to contract upon the tire-building drum.

2. A method of applying a band of elastic material to a tire-building drum which comprises placing an endless band of said material within a hollow cylinder having an internal diameter greater than the external diameter of the tire-building drum and an axial length less than that of said band so that substantial portions of said band project axially beyond the opposite ends of said cylinder, causing said band to expand and to press radially outwardly against the interior of said cylinder throughout the length and circumference of said cylinder to exclude air from between said band and said cylinder, turning the opposite end portions of said band radially outwardly and axially inwardly over the end portions of said cylinder to form cuffs, moving the cylinder axially toward the drum to position the band around the drum while continuing to exclude air from between said band and the interior surface of said cylinder to maintain an air pressure differential between the radially inner and outer surfaces of said band sufficient to hold the band in its expanded position against said interior surface, and thereafter moving the cuffed end portions of the band axially away from said cylinder and permitting air to enter between the band and the cylinder to release the band from the cylinder and to cause the band to contract upon the drum.

3. A method of applying a band of elastic material to a tire-building drum which comprises placing an endless band of said material within a hollow cylinder having an internal diameter greater than the external diameter of the tire-building drum and an axial length less than that of said band so that substantial portions of said band project axially beyond the opposite ends of said cylinder, applying fluid pressure uniformly to the interior of said band to press the band radially outwardly against the interior of said cylinder to exclude air from between said band and said cylinder, turning the opposite end portions of said band radially outwardly and axially inwardly over the end portions of said cylinder to form cuffs, holding the band in its expanded position against the interior of said cylinder by air pressure with said cylinder in a fixed position while moving the cylinder toward the drum to position the band around the tire-building drum, and releasing the band from the cylinder by admitting air between the band and the cylinder to allow the band to contract upon the drum.

4. Apparatus for placing a preformed band of elastic material on a tire-building drum comprising an inflatable bag of generally cylindrical shape spaced from said drum, a rigid hollow transfer cylinder having a diameter greater than that of said bag and said drum and an axial length less than that of said band, means mounting said cylinder for movement between a receiving position surrounding said bag and a discharge position surrounding said drum and for holding said cylinder against rotation, means for inflating said bag to apply pressure uniformly to the interior of said band to expand the band against the interior surface of said cylinder and for removing substantially all of the air from between said band and said interior surface, and means carried by said cylinder for excluding air from between said band and said interior surface to maintain an air pressure differential between the radially inner and outer surfaces of said band sufficient to hold the band in its expanded position against said interior surface as the cylinder is placed around said drum, whereby the expanded band may be moved with the cylinder over the drum and then released from the cylinder by admitting air between said band and said interior surface.

5. Apparatus as defined in claim 4 wherein said cylinder has a knurled interior band-engaging surface which provides air-conducting passages extending to the ends of said cylinder.

6. Apparatus as defined in claim 5 wherein the interior band-engaging surface of said cylinder comprises a multiplicity of small protuberances and small grooves at the bases of said protuberances for conducting air to the ends of said cylinder.

7. Apparatus for placing a preformed band of elastic material on a tire-building drum comprising a transfer cylinder of greater diameter than said drum mounted on a carriage in substantial axial alignment with said drum and having an open end for receiving said drum, an expansible band-holding drum spaced from said tire-building drum having a generally cylindrical outer surface and mounted in substantial axial alignment with said tire-building drum, said expansible drum being movable radially from a contracted position wherein its cylindrical outer surface has a diameter less than that of said band and said tire building drum to an expanded position wherein the expansible drum presses the band against the interior of the transfer cylinder, a rigid horizontal beam above said tire-building drum and said band-holding drum and having horizontal flanges providing a track runway for carrying said transfer cylinder between said drums, and a trolley mounted at the top of said carriage having trolley wheels rotatably mounted thereon for engaging the flanges of said track runway, the trolley supporting said transfer cylinder and preventing rotation thereof while permitting movement thereof from a position wherein it surrounds the expansible band-holding drum to a position wherein it surrounds the tire-building drum.

8. A method of applying an endless band of fabric reinforced elastic material to a tire-building drum comprising mounting said band on a radially expansible band holder having radially movable portions normally spaced from a horizontal central axis a distance less than the radius of said tire-building drum so that the lower portion of the band sags below the band holder, moving said movable portions of said holder radially outwardly and turning the band holder about said axis to assist in equalizing the spacing of the cords of said band, said turning taking place at least in part while the band is loosely mounted on the band holder, positioning the holder with the band thereon within a rigid hollow cylinder having an internal circumference greater than the circumference of said tire-building drum while continuing to move said movable portions of said holder radially outwardly to expand and press said band against the interior surface of said cylinder to remove the air from between said band and said interior surface and create an air pressure differential between the radially inner and outer surfaces of said band that holds the band in its expanded position against said surface with the cylinder in a fixed position, holding the band in its expanded position against said interior surface by cuffing the ends of said band over the ends of the cylinder and by excluding the entry of air between said band and said interior surface to maintain said air pressure differential while positioning said band and said cylinder around said tire-building drum, and releasing said band from said cylinder by unfolding the cuffs and admitting air between the band and said interior surface to transfer the band to the tire-building drum.

9. A method as defined in claim 8 wherein the band is initially mounted on the band holder loosely so that a portion thereof sags below the band holder and said turning of the band holder terminates when the initial sagging portion of the band is uppermost and before the band is expanded against said interior surface.

10. A method of applying a preformed band of fabric-reinforced elastic material to a tire-building drum which comprises placing said band on an inflatable bag of generally cylindrical form having a circumference less than that of said band when deflated, inflating said bag to expand said band to remove wrinkles therefrom and then deflating the bag so that the band hangs loosely on the bag, thereafter equalizing the spacing of the cords of said band by turning the band substantially one-half revolution and reinflating the bag to reexpand said band, positioning the bag with the band thereon within a hollow cylinder having a circumference greater than that of said drum and an axial length less than that of said band so that the end portions of the band project axially several inches beyond the opposite ends of the cylinder, continuing to inflate the bag to press the band against the interior surface of said cylinder to expel the air from between said band and said interior surface, cuffing said end portions over the ends of said cylinder, deflating said bag and positioning said cylinder with the band thereon around said tire-building drum, removing the cuffs from the ends of said cylinder, and permitting air to enter between the band and said interior surface to permit the band to contract on said drum.

11. Apparatus for placing a preformed band of elastic tire-building material on a tire-building drum comprising a transfer cylinder having an interior band-engaging surface with a diameter greater than that of said drum, said cylinder being formed with an axial length less than that of said band to permit turning of the opposite end portions of the band over the end portions of the cylinder to form cuffs, a band holder spaced from said tire-building drum having means for pressing the band radially outwardly against said interior surface throughout substantially the entire length and circumference of said cylinder to expel air from between said band and said interior surface, means mounting said cylinder for movement between a receiving position surrounding said band holder and a discharge position surrounding said drum, and means carried by said cylinder for excluding air from between said band and said interior surface to maintain an air pressure differential between the inner and outer surfaces of said band sufficient to hold the band in its expanded position against said interior surface as the band and the cylinder are positioned around the drum, said last-named means comprising a multiplicity of protuberances arranged in said interior band-engaging surface substantially throughout the length and circumference thereof, whereby the band may be carried by the cylinder and moved over the tire-building drum in its expanded position without rotating the cylinder and released from the cylinder by permitting air to enter between the band and said interior surface.

References Cited in the file of this patent

UNITED STATES PATENTS

| | | |
|---|---|---|
| 2,084,009 | Sohl | June 15, 1937 |
| 2,182,176 | Maranville | Dec. 5, 1939 |
| 2,409,974 | Breth et al. | Oct. 22, 1946 |
| 2,476,884 | Maynard | July 19, 1949 |
| 2,497,226 | McNeill | Feb. 14, 1950 |
| 2,517,889 | Kuffler | Aug. 8, 1950 |
| 2,521,143 | Benson | Sept. 5, 1950 |
| 2,565,071 | Frazier | Aug. 21, 1951 |
| 2,699,198 | Balzhiser | Jan. 11, 1955 |
| 2,822,027 | Hollis | Feb. 4, 1958 |

UNITED STATES PATENT OFFICE
CERTIFICATE OF CORRECTION

Patent No. 2,871,912 February 3, 1959

Herman T. Kraft

It is hereby certified that error appears in the printed specification of the above numbered patent requiring correction and that the said Letters Patent should read as corrected below.

Column 14, line 32, for the claim reference numeral "5" read -- 4 --.

Signed and sealed this 26th day of May 1959.

(SEAL)
Attest:

KARL H. AXLINE
Attesting Officer

ROBERT C. WATSON
Commissioner of Patents